United States Patent [19]

Kawai

[11] Patent Number: 4,514,039
[45] Date of Patent: Apr. 30, 1985

[54] LENS MOUNTING

[75] Inventor: Tohru Kawai, Kanagawa, Japan

[73] Assignee: Canon Kabushiki Kaisha, Tokyo, Japan

[21] Appl. No.: 452,077

[22] Filed: Dec. 22, 1982

[30] Foreign Application Priority Data

Dec. 25, 1981 [JP] Japan .................................. 56-209310

[51] Int. Cl.³ ............................................... G02B 7/02
[52] U.S. Cl. ..................................... 350/255; 350/252
[58] Field of Search ......... 350/242, 252, 255, 429–430

[56] References Cited

U.S. PATENT DOCUMENTS

| | | | |
|---|---|---|---|
| 3,817,601 | 6/1974 | Colaiace et al. | 350/255 |
| 3,877,794 | 4/1975 | Kulle et al. | 350/429 |
| 3,951,522 | 4/1976 | Hashimoto | 350/429 |
| 4,299,470 | 11/1981 | Shimizu | 350/252 |
| 4,336,979 | 6/1982 | Hamatani | 350/255 |

Primary Examiner—William H. Punter
Attorney, Agent, or Firm—Toren, McGeady, Stanger, Goldberg & Kiel

[57] ABSTRACT

Formed in a movable sleeve of a lens mounting are axial guide portions and cutout portions imparting to the guide portions an elastic deformation when the guide portions are brought into fitting engagement with respective guide grooves of a fixed sleeve.

4 Claims, 9 Drawing Figures

LENS MOUNTING

BACKGROUND OF THE INVENTION

1. Field of the Invention

This invention relates to lens mountings having movable lens cells, and more particularly to the structure of a device for movably fitting the lens cell into a fixed support tube.

2. Description of the Prior Art

In the past, among several kinds of lens mountings there has been one which is adapted to be used with an optical system that is constructed with lens members movable relative to other lens members to effect, for example, focusing, zooming, or the like. And, a cell holding the movable lens member is slidably mounted to a fixed support tube having, for example, three axially elongated key grooves formed in the inner surface thereof as respective keys fixed to the lens cell engage in the key grooves so as to suspend the lens cell.

FIGS. 1(a) and 1(b) in sectional views illustrate this conventional kind of lens mounting where an outer barrel 1 has three key grooves 1a, 1b and 1c formed in the inner surface thereof in spaced relation to each other by angles $\theta_1$ and $\theta_2$ as measured from the first key groove 1a. Assuming that a lens cell 2 has keys 3a, 3b and 3c formed on the outer surface thereof in spaced relation by angles $\theta_1'$ and $\theta_2'$ respectively, then in order to provide assurance that the lens cells 2 can be built into the outer barrel 1, it is rigorously required that $\theta_1 = \theta_1'$ and $\theta_2 = \theta_2'$.

On this account, it has been the general actual practice in the prior art that any two of the aforesaid three keys 3a, 3b and 3c are made movable relative to the cell body for later adjustment in position and that after that adjustment has been completed, the movable keys are then fixedly secured to the cell body by fastener screws or the like (not shown).

However, such adjusting operation is carried out manually, and as the once-established adjustment is often broken during the fixedly securing operation, it cannot be always assured that the lens cell will be readily moved in the outer barrel. Thus, the assembling operation is time-consuming and also necessitates experience and skill. Because of this, quality is not stable in uniformity from article to article, and there occurs an increase in the production cost.

SUMMARY OF THE INVENTION

It is an object of the present invention to eliminate the above-described drawbacks and to provide a lens mounting with means making it possible to assemble a movable lens cell and a fixed body tube without having to employ the adjusting operation.

In particular, determination of a shape to which the cell is formed is made so as to obtain a shift of a projected portion or key from the ideal angular position by utilizing elastic deformation with the advantage that as far as the deviation of the angular position of the key in the as-machined state falls within a specified tolerance, the shift can be absorbed by the elastic deformation, thus eliminating the necessity of employing an adjusting operation.

DETAILED DESCRIPTION OF THE PREFERRED EMBODIMENTS

The present invention will next be described in connection with embodiments thereof by reference to the drawings.

Figure 1A:
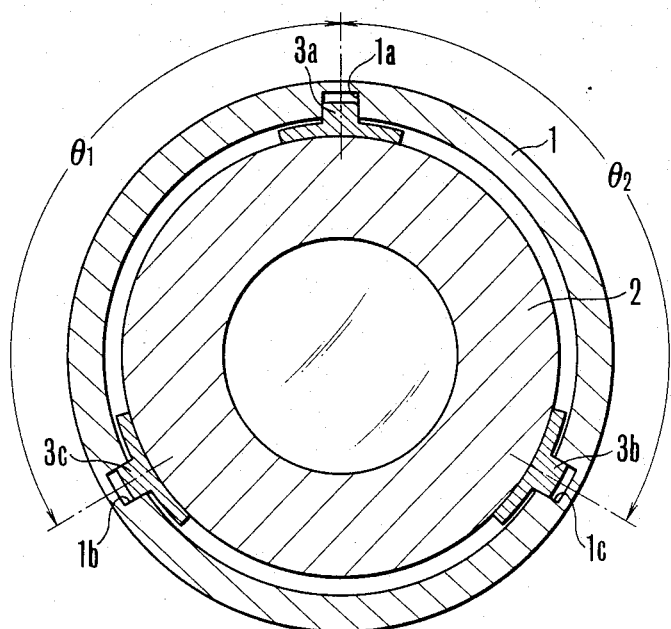
FIG. 1 illustrates the main parts of a conventional example of the lens mounting with FIG. 1(a) being its crosssectional view, and FIG. 1(b) illustrating the lens cell in separation.
Figure 1B:
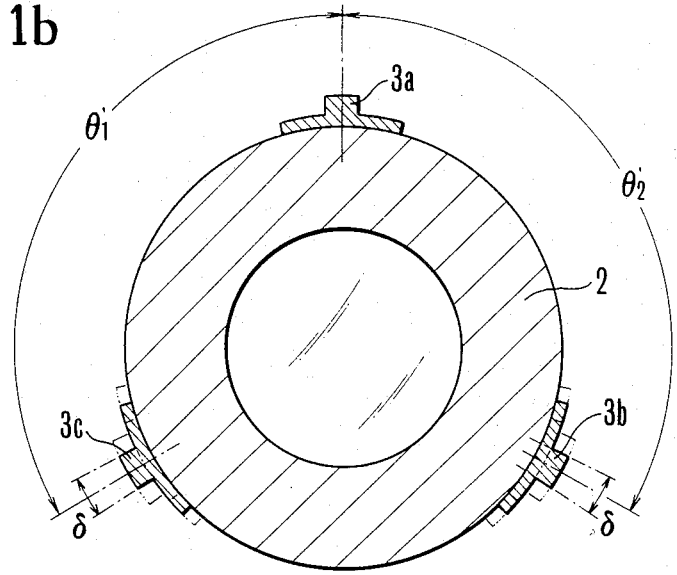
Figure 2A:
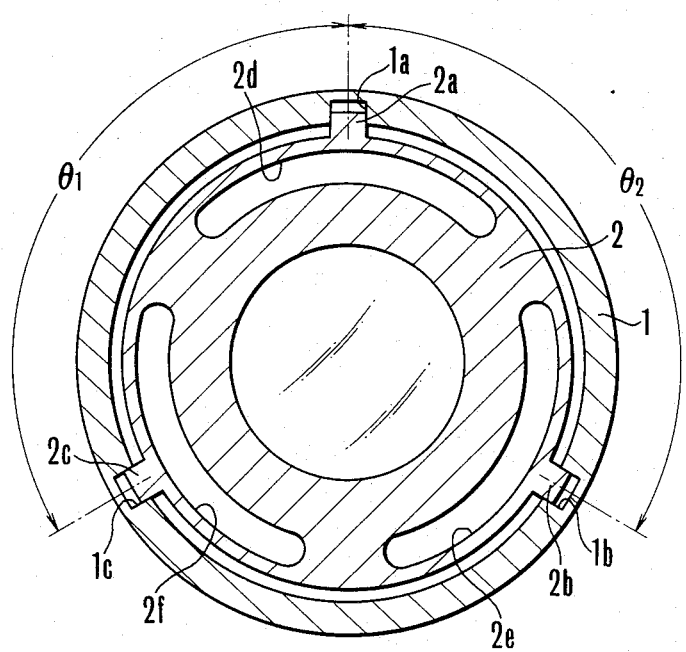
FIG. 2 illustrates the main parts of a lens mounting of the present invention with FIG. 2(a) being a crosssectional view and FIG. 2(b) illustrating the lens cell in normal and deformed positions.
Figure 2B:
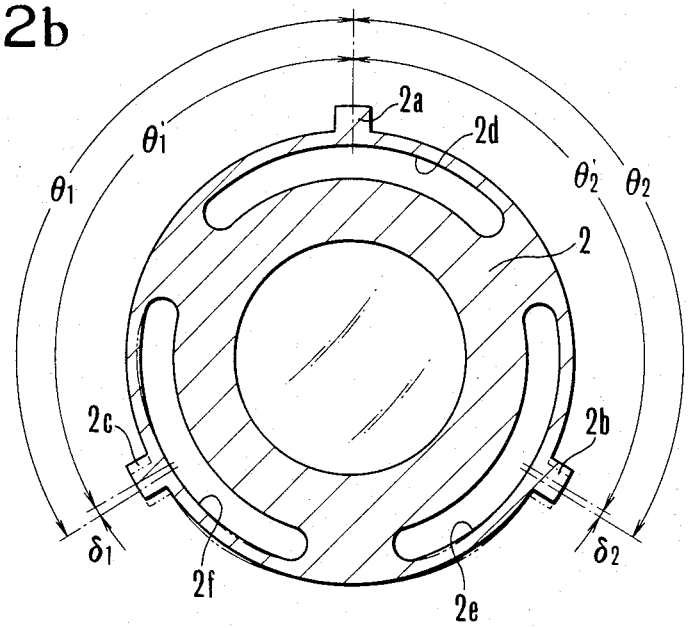
Figure 3:
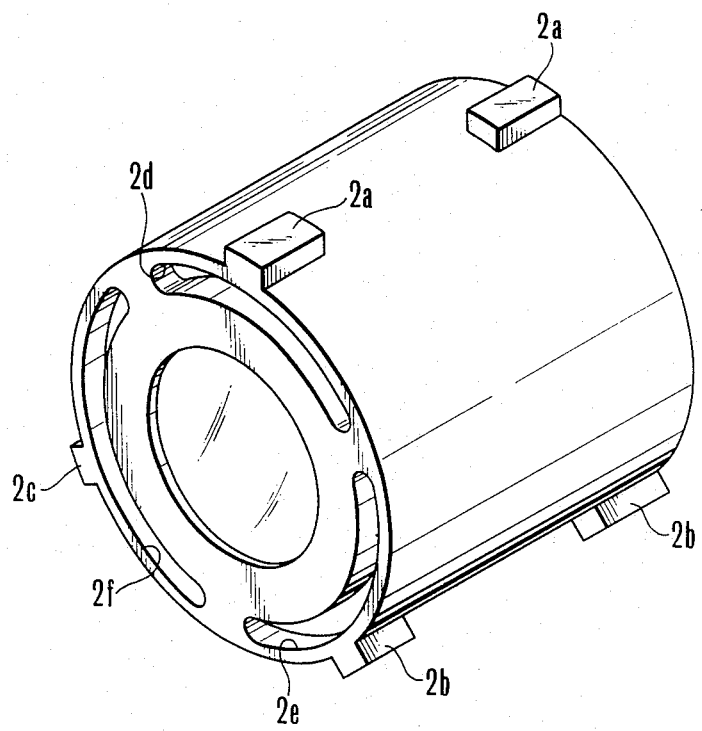
FIG. 3 is a perspective view of the lens cell of the present invention.
Figure 4:
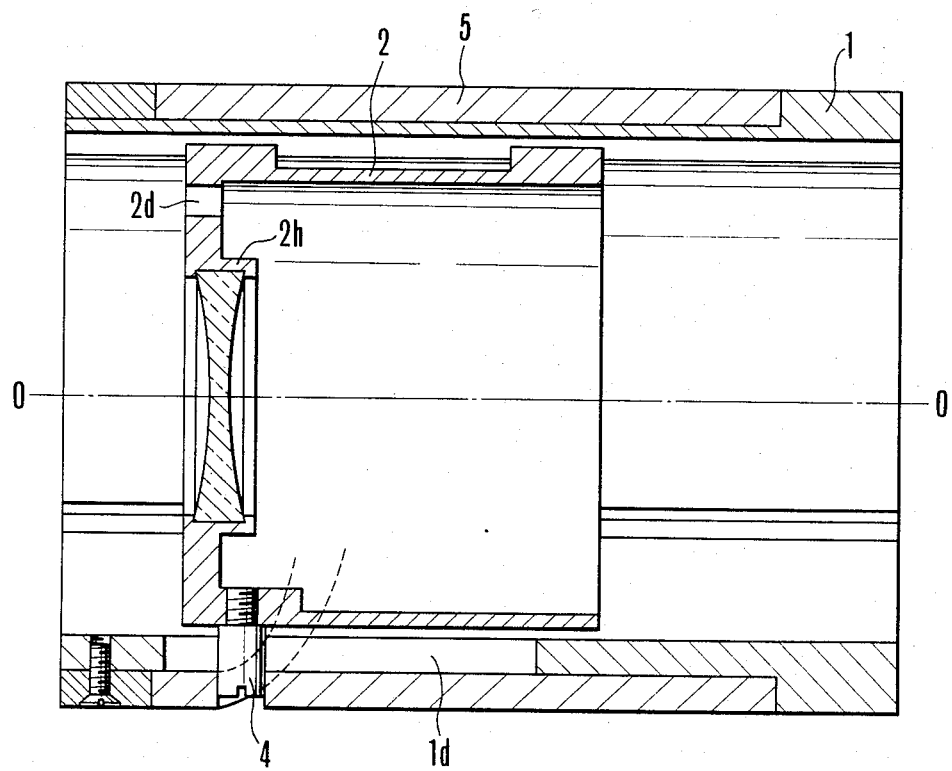
FIG. 4 is a longitudinal section view of the main parts of one embodiment of the lens mounting according to the present invention.

In FIGS. 2 through 4 there is shown one embodiment of the invention. Formed in the inner surface of a first lens barrel 1 are three axial key grooves 1a, 1b and 1c located at given angular positions. A second lens barrel or movable sleeve 2 has three pairs of keys 2a, 2b and 2c in the form of projected portions extending radially outwardly of the outer surface thereof at either side in the same relationship as that of the angular positions of the grooves. A radial flange inwardly extending from one end of the movable sleeve 2 to form a lens support 2h is provided with three cutout portions 2d, 2e and 2f with their centers of length being in alignment with the respective keys 2a, 2b and 2c, whereby a resilient property is imparted to each of the keys.

When the movable sleeve 2 is installed within the outer lens barrel 1 in such a way that the keys 2a, 2b and 2c are fitted into the respective key grooves 1a, 1b and 1c, the keys 2b and 2c are allowed to shift their position in the circumferential direction by distances depending upon the deviation of the actual values of the design parmeters of the keys 2b and 2c from the ideal ones, whereby a deformation takes place as illustrated by dashed lines in FIG. 2(b). Though, at this time, the optical axis of the movable lens is caused to be moved slightly off center, no problem arises provided that a difference between the actual and ideal values falls within the specified range. In other words, even in the case of worst possible combinations of the actual displacements $\delta_1$ and $\delta_2$ with respect to the direction of shift, upon translation of this displacement to deviation of the center from the optical axis of the entire lens system, it is, however, reduced so rapidly as to often give no problem in actual practice.

FIG. 4 illustrates an example of the operating mechanism for the movable sleeve of FIG. 3. Provided through the wall of the outer lens barrel 1 is an axially elongated escapement slot 1d adapted not to hinder axial movement of a cam follower 4 radially outwardly extending from the movable sleeve 2 into an arcuate slot of a cam sleeve 5 which is rotatably fitted on the outer diameter of the barrel 1. With this, therefore, when the cam sleeve is turned, as the movable sleeve 2 is restrained from rotation by the three key-and-groove connections, it is driven to move axially.

Figure 5:
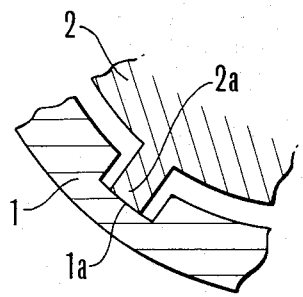
FIG. 5 is a fragmentary sectional view of another example of the fitting structure between the outer lens barrel and the lens cell.

It should be pointed out here that the key-and-groove connection may be otherwise formed as illustrated in FIG. 5 where each key on the movable sleeve 2 is allowed to radially shift because the top surface of the key 2a is in contact with the bottom of the groove 1a. In this case, to avoid production of a stress (tangential stress) due to the angular error of the key, there is provided a looseness on either side of the key. It is, therefore, required that as well as the axial escapement slot of FIG. 4 a straight guide slot is provided.

Figure 6:
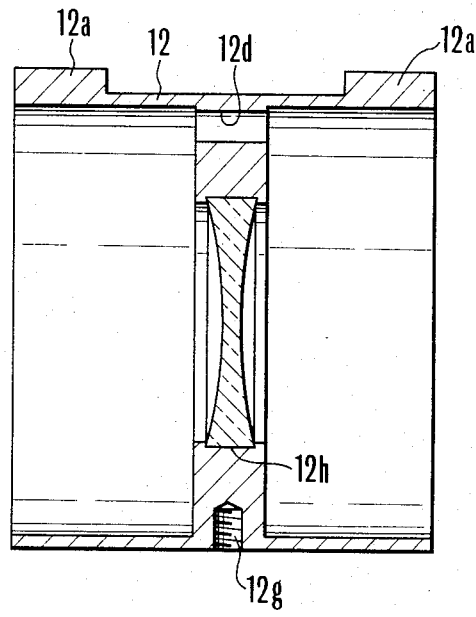
FIG. 6 is a longitudinal section view of another embodiment of the movable lens cell according to the present invention.

Of the many forms which will obtain a resilient property in the movable lens sleeve the preferred one is, for example, that illustrated in FIG. 6, wherein a lens support portion 12h is positioned on a sleeve 12 away from the front and rear key bearing portions 12a, and wherein also a cam follower base 12g is provided in a rigid portion, that is, near the lens support portion 12g and away from the cutout portions 12d.

Figure 7:
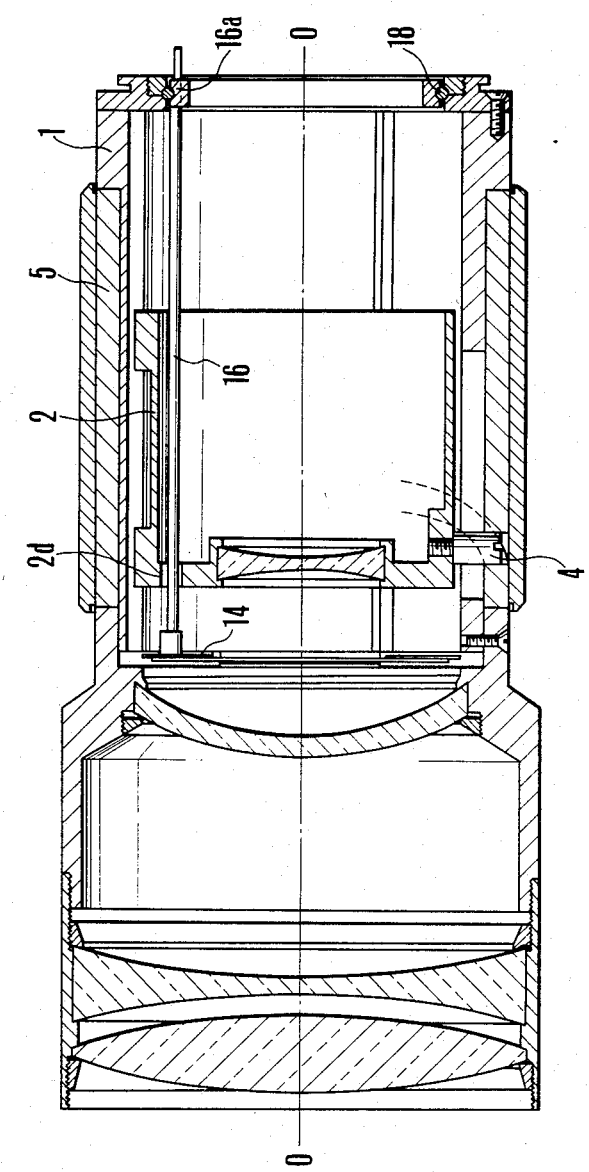
FIG. 7 is a longitudinal section view of an interchangeable lens mounting employing one form of the present invention.

In FIG. 7 there is shown an example of application of the aforesaid embodiment to an interchangeable lens mounting a portion whereby one of the cutout portions of the movable lens sleeve 2, namely, 2d, is utilized as a clearance hole for a control member of a diaphragm. In the conventional interchangeable lens mounting for single lens reflex cameras, in order to make the diaphragm device 14 within the lens system cooperative with an exposure control apparatus (not shown) within a camera housing, there is provided an interlocking member 16 arranged to rotate about the optical axis within the lens mounting. This interlocking member 16 is rotatably supported by a ring portion 16a fitted in a stationary portion of the lens barrel 1 through a ball bearing 18. In the past, the aforesaid interlocking member has been arranged on the outer periphery of the movable lens sleeve 2 for swinging movement in a given range of angles. When an arrangement is modified according to the present invention, it is possible to utilize the space effectively so that the diameter of the lens mounting can be reduced over the entire length thereof.

It is of course possible to apply the method of holding the movable lens sleeve or cell not only to the lens mountings for cameras but also to those for other imaging instruments.

As has been described above, the present invention seeks to provide for movable lens cells in lens mounting devices a guiding and holding means which obviates the necessity of later adjustment of the projected portion, for example, a key, whereby with the machining of the key groove of the body tube, there is no need to adhere to particularly severe tolerance, the advantage being that the assembly operation of the parts of the lens mounting becomes easy to perform.

Moreover, the movable lens cell is made amenable to plastic molding techniques, and, therefore, can be manufactured economically.

While specific embodiments of the invention have been shown and described in detail to illustrate the application of the inventive principles, it will be understood that the invention may be embodied otherwise without departing from such principles.

Further, the use of the cutout portions in the radial flange between the outer portion or sleeve and the lens support enables the space to be effectively utilized in arranging the interlocking member for the diaphragm or the like with an additional advantage that the diameter of the lens mounting can be reduced.

What I claim:

1. A lens mounting assembly defining an optical axis comprising:
   a generally cylindrical support member having an inner surface;
   an integrally formed sleeve fitted within said support member for sliding movement relative thereto;
   guide means interposed between said sleeve and said inner surface to guide movement of said sleeve relative to said support member longitudinally along said optical axis, said guide means including guide members projecting radially outwardly from said sleeve for sliding engagement with said support member;
   lens support means on said sleeve formed integrally with said guide means for supporting a lens member therein; and
   cutout portions on said sleeve between said guide means and said lens support means for imparting resiliency to parts of said sleeve having said guide portions thereon to enable said guide portions to resiliently adjust in position when said sleeve is fitted into said support member.

2. An assembly according to claim 1, wherein said guide members comprise keys and wherein said inner surface is formed with slots having said keys engaged therein.

3. A lens mounting assembly having an optical axis comprising:
   an outer lens barrel having a plurality of guide slots; and
   a movable sleeve having a support portion for containing optical element means therein, a cylindrical portion formed on the outer periphery of said lens support portion, key portions arranged on said cylindrical portion to fit in said guide slots, and a plurality of cutout portions formed between said cylindrical portion and said lens support portion about an optical axis;
   said key portions having resiliency imparted thereto by said cutout portion, with said optical element means being held on said optical axis by fitting engagement of said guide slots of the outer lens barrel and said key portions of said movable sleeve.

4. A lens mounting assembly having an optical axis comprising:
   a lens barrel having a plurality of guide slots;
   a movable sleeve having a lens support portion for containing optical element means therein, key portions fitting in said guide slots of said lens barrel, and an arcuate cutout portion for imparting a resilient property to said key portions; and
   a member for transmitting an exposure control signal, said transmission member being arranged to penetrate said cutout portion and to be swingable within the arcuate opening of said cutout portion.

* * * * *